(12) United States Patent
Ocvirk et al.

(10) Patent No.: US 12,446,802 B2
(45) Date of Patent: Oct. 21, 2025

(54) DIFFUSION LAYER FOR AN ENZYMATIC IN-VIVO SENSOR

(71) Applicant: Roche Diabetes Care, Inc., Indianapolis, IN (US)

(72) Inventors: Gregor Ocvirk, Mannheim (DE); Angelika Fuerst, Mannheim (DE); Alexander Steck, Mannheim (DE); Juergen Woehrle, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 1134 days.

(21) Appl. No.: 17/088,329

(22) Filed: Nov. 3, 2020

(65) Prior Publication Data

US 2021/0045664 A1    Feb. 18, 2021

Related U.S. Application Data

(63) Continuation of application No. PCT/EP2019/061177, filed on May 2, 2019.

(30) Foreign Application Priority Data

May 4, 2018    (EP) ..................... 18170896

(51) Int. Cl.
| | | |
|---|---|---|
| A61B 5/145 | (2006.01) | |
| A61B 5/1486 | (2006.01) | |
| B01D 69/02 | (2006.01) | |
| B01D 71/40 | (2006.01) | |
| B01D 71/80 | (2006.01) | |

(Continued)

(52) U.S. Cl.
CPC ........ *A61B 5/14532* (2013.01); *A61B 5/1486* (2013.01); *B01D 69/02* (2013.01); *B01D 71/401* (2022.08); *B01D 71/80* (2013.01);

*C12N 11/087* (2020.01); *C12Q 1/002* (2013.01); *C12Q 1/006* (2013.01); *B01D 2323/12* (2013.01);

(Continued)

(58) Field of Classification Search
CPC ...................................................... A61K 47/58
See application file for complete search history.

(56) References Cited

U.S. PATENT DOCUMENTS

| | | | |
|---|---|---|---|
| 6,294,614 B1 * | 9/2001 | Kataoka | C08F 297/02 |
| | | | 525/283 |
| 10,422,765 B2 * | 9/2019 | Staib | G01N 27/3272 |

(Continued)

FOREIGN PATENT DOCUMENTS

| | | |
|---|---|---|
| CN | 103443286 A | 12/2013 |
| EP | 2 163 190 A1 | 3/2010 |

(Continued)

OTHER PUBLICATIONS

Thermal Transitions of Homopolymers flyer (Year: NA).*

(Continued)

*Primary Examiner* — Irina Krylova
(74) *Attorney, Agent, or Firm* — Bose Mckinney & Evans LLP

(57) ABSTRACT

The present disclosure relates to an electrode system for measuring the concentration of an analyte under in-vivo conditions, comprising an electrode with immobilized enzyme molecules and a diffusion barrier that controls diffusion of the analyte from body fluid surrounding the electrode system to the enzyme molecules.

16 Claims, 7 Drawing Sheets

(51) Int. Cl.
*C12N 11/087* (2020.01)
*C12Q 1/00* (2006.01)
*C08L 33/10* (2006.01)

(52) U.S. Cl.
CPC ...... *B01D 2325/32* (2013.01); *B01D 2325/34* (2013.01); *B01D 2325/36* (2013.01); *C08L 33/10* (2013.01)

(56) References Cited

U.S. PATENT DOCUMENTS

| | | | |
|---|---|---|---|
| 2005/0095466 A1* | 5/2005 | Minteer | H01M 4/8605 429/526 |
| 2008/0034972 A1 | 2/2008 | Gough et al. | |
| 2011/0196216 A1 | 8/2011 | Quarder et al. | |
| 2011/0245422 A1 | 10/2011 | Disson et al. | |
| 2013/0143131 A1* | 6/2013 | Samukawa | H01M 4/96 429/401 |
| 2013/0213110 A1 | 8/2013 | Papadimitrakopoulos et al. | |
| 2014/0018653 A1* | 1/2014 | Staib | A61B 5/14865 600/347 |

FOREIGN PATENT DOCUMENTS

| | | |
|---|---|---|
| EP | 2 831 263 A1 | 2/2015 |
| EP | 3 219 807 A1 | 9/2017 |
| JP | 2002-100404 A | 4/2002 |
| JP | 2015-515305 A | 5/2015 |
| WO | WO 2006/058779 A1 | 6/2006 |
| WO | WO 2007/147475 A1 | 12/2007 |
| WO | WO 2010/028708 A1 | 3/2010 |
| WO | WO 2012/130841 A1 | 10/2012 |
| WO | WO 2013/144255 A1 | 10/2013 |

OTHER PUBLICATIONS

Gost R 52379-2005, Good Clinical Practice, Federal Agency for Technical Regulation and Metrology, Official Edition, 2006, 39 pages.
Wu et al., Modern Paint Formula Design, Chemical Industry Press, Mar. 31, 2000, pp. 39-42.
International Search Report and Written Opinion of the International Searching Authority, PCT/EP2019/061177, Jun. 12, 2019, 10 pages.
Rouse, A Theory of the Linear Viscoelastic Properties of Dilute Solutions of Coiling Polymers, The Journal of Chemical Physics, 1953, vol. 21, pp. 1272-1280.
Okouchi et al., Contact Angle of Poly(alkyl methacrylate)s and Effects of the Alkyl Group, Macromolecules, 2006, vol. 39, pp. 1156-1159.
Böker et al., Nanoscopic Surface Patterns from Functional ABC Triblock Copolymers, Macromolecules, 2001, vol. 34, pp. 7477-7488.
Mang et al., Biocompatibility of an Electrochemical Sensor for Continuous Glucose Monitoring in Subcutaneous Tissue, Diabetes Technology & Therapeutics, © Mary Ann Liebert, Inc., 2005, vol. 7, No. 1, pp. 163-173.
Boztas et al., Immobilization and Release of the Redox Mediator Ferrocene Monocarboxylic Acid from within Cross-Linked p(HEMA-co-PEGMA-co-HMMA) Hydrogels, Biomacromolecules, 2009, vol. 10, No. 8, pp. 2135-2143.
Kudryashov, Biosensor Devices: Lectures, Minsk, BGU, 2003, 110 pages, cf. pp. 17-18.
Zhebentyaev et al., Electrochemical Analysis Methods, Vitebsk, 2015, 106 pages, cf. pp. 6-7.
Chueshov, Industrial Medication Technology, V. 1, Kharkov, ed. NFAU, 2002, 559 pages, p. 24, paragraphs 1-2.
Semchikov, High-Molecular Compounds, Educational Book for Universities / N. Novgorod: Publ. Nizhegorodkiy State University of N.I. Lobachevskiy M., Publishing Center "Akademiya," 2003, 368 pages, cf. pp. 148-150.

\* cited by examiner

Poly(BUMA-r-MMA-b-HEMA)     Poly(nBuA-HEMA)
                            (block copolymer B)

DIFFUSION LAYER FOR AN ENZYMATIC IN-VIVO SENSOR

RELATED APPLICATIONS

This application is a continuation of PCT/EP2019/061177, filed May 2, 2019, which claims priority to EP 18 170 896.7, filed May 4, 2018, the entire disclosures of both of which are hereby incorporated herein by reference.

BACKGROUND

This disclosure relates to an electrode system for measuring the concentration of an analyte under in-vivo conditions, comprising an electrode with immobilized enzyme molecules and a diffusion barrier that controls diffusion of the analyte from body fluid surrounding the electrode system to the enzyme molecules.

Sensors with implantable or insertable electrode systems facilitate measurements of physiologically significant analytes such as, for example, lactate or glucose in a patient's body. The working electrodes of systems of this type have electrically conductive enzyme layers in which enzyme molecules are bound which release charge carriers by catalytic conversion of analyte molecules. In the process, an electrical current is generated as measuring signal whose amplitude correlates to the analyte concentration.

Such electrode systems are, e.g., known from WO 2007/147475, WO 2010/028708 and WO 2012/130841, the contents of each of which are hereby incorporated herein by reference.

The working electrodes of the electrode system are provided with a diffusion barrier that controls the diffusion of the analyte to be determined from the body fluid or tissue surrounding the electrode system to the enzyme molecules that are immobilized in the enzyme layer.

WO 2007/147475 discloses a diffusion barrier made from a polymer having a zwitterionic structure. An example of such a polymer is poly(2-methacryloyloxyethyl-phosphorylcholine-co-n-butylmethacrylate). The zwitterionic polymer may be mixed with another polymer, for example polyurethane.

According to WO 2010/028708, the diffusion barrier of the electrode system is formed from mixtures of at least two different statistic acrylate polymers. The polymers may be copolymers, e.g., copolymers of methyl methacrylate and hydroxyethyl methacrylate or copolymers of butyl methacrylate and hydroxyethyl methacrylate.

The use of polymer or copolymer mixtures, however, has drawbacks in that the preparation of the mixture and its application to the sensor is tedious and potentially problematic. Usually, the polymers to be mixed are individually dissolved and the resulting solutions are thereafter mixed in the desired ratio. This, however, may result in precipitation of one of the components and consequently in workability problems, e.g., in a spraying process. Increased difficulties occur when the mixture comprises a polymer with ionic characteristics, i.e., when one of the polymers to be mixed comprises a monomer having anionic or cationic groups. The presence of such charged groups, however, has a strong effect on the solubility, making it difficult to find a solvent suitable for both the charged polymer and an uncharged polymer.

WO 2012/130841 discloses a diffusion barrier of an electrode system which comprises a block copolymer, e.g., a single block copolymer having at least one hydrophilic block and at least one hydrophobic block. The hydrophobic block has a glass transition temperature in the range from 40 to 80° C. The hydrophilic and hydrophobic blocks are covalently linked to each other within the polymer molecules.

WO 2006/058779 discloses an enzyme-based sensor with a combined diffusion and enzyme layer comprising at least one polymer material, and particles carrying an enzyme, wherein the particles are dispersed in the polymer material. The polymer may comprise hydrophilic as well as hydrophobic polymer chain sequences, for example, the polymer may be a high or low water uptake polyether-polyurethane copolymer. The use of block copolymers having at least one hydrophilic block and at least one hydrophobic block as a diffusion layer is not disclosed.

EP-A-2 163 190 describes an electrode system for the measurement of an analyte concentration in-vivo comprising a counter electrode with an electric conductor, and a working electrode with an electric conductor on which an enzyme layer comprising immobilized enzyme molecules is localized. A diffusion barrier controls the diffusion of the analyte from surrounding body fluids to the enzyme molecules. The diffusion barrier may comprise hydrophilized polyurethanes obtainable by polycondensation of 4,4'-methylene-bis-(cyclohexylisocyanate) and diol mixtures which may be polyethylene glycol and polypropylene glycol. The hydrophilic polyurethane layer may be covered with a spacer, e.g., a copolymer of butyl methacrylate and 2-methacryloyloxyethyl-phosphoryl choline. The use of block copolymers having at least one hydrophilic block and at least one hydrophobic block as a diffusion layer is not disclosed.

U.S. Publication No. 2008/0034972 describes an implantable glucose sensor comprising a membrane composed of intimately associated hydrophilic and hydrophobic polymers. The intimate association of the hydrophilic and hydrophobic polymers is in the form of interpenetrating polymer networks or polymer blends. The hydrophilic and hydrophobic polymers are not directly linked to each other.

SUMMARY

This disclosure teaches a diffusion barrier on an electrode system of an enzymatic in-vivo sensor which provides improved physico-chemical characteristics and which can be manufactured easily.

A diffusion barrier is provided comprising a block copolymer having at least one hydrophilic block and at least one hydrophobic block wherein the block copolymer comprises from 75 to 95 mol-% of at least one hydrophilic block and from 5 to 25 mol-% of at least one hydrophobic block, based on the total amount (mol) of the block copolymer in the dry state. The mol-% of the hydrophilic block and the hydrophobic block in a block copolymer can be determined by nuclear magnetic resonance (NMR). In an embodiment, the NMR measurements ($^1$H NMR measurement) are performed with a Bruker DRX 300 with deuterated chloroform for the hydrophobic block and deuterated pyridine, or deuterated dimethylformamide/deuterated methanol (80/20) (v/v) for the block copolymer as solvent and a sample concentration between 20 and 30 mg/ml.

The hydrophilic and hydrophobic blocks are covalently linked to each other. Preferably the hydrophilic and hydrophobic blocks are made up from (meth)acrylate monomeric units. In a particular embodiment the hydrophilic block comprises 2-hydroxyethyl methacrylate (HEMA) monomeric units and the hydrophobic block comprises n-butyl acrylate (n-BuA) monomeric units.

The block-copolymer based diffusion barrier provides excellent physico-chemical characteristics as follows:
(i) permeability of the diffusion barrier for the analyte to be determined,
(ii) permeability characteristics of the diffusion barrier which are suitable for the short-term behaviour (wettability) and the long-term behaviour (sensor drift) of the electrode,
(iii) mechanical flexibility of the diffusion barrier, which allows the manufacture of in-vivo sensors with extended multiple electrodes;
(iv) efficient incorporation of ionic groups into the diffusion layer, i.e., the density of cationic or anionic charges within the polymer can be efficiently adjusted, this is relevant for repulsion or attraction of charged analytes, and/or control of cell adhesion, e.g., of monocytes from the surrounding body fluid or tissue.

In particular, this disclosure provides a diffusion barrier having excellent mechanical stability and flexibility as well as favorable permeability characteristics with respect to the short-term behaviour (wettability) and the long-term behaviour (sensor drift) of the electrode. The high permeability of the diffusion barrier for the analyte allows the manufacturing of particularly small sensors. Further, when using hydrophobic blocks with a glass transition temperature (Tg) considerably below the body temperature, i.e., with a Tg of about 0° C. or less, e.g., of at least about 80° C. below the body temperature, the block copolymer is in a rubbery state, where it is soft and flexible, at room and body temperature.

A subject-matter of this disclosure is an electrode system for measuring the concentration of an analyte under in-vivo conditions, comprising an electrode with immobilized enzyme molecules and a diffusion barrier that controls diffusion of the analyte from the exterior of the electrode system to the enzyme molecules, characterized in that the diffusion barrier comprises a block copolymer having at least one hydrophilic block and at least one hydrophobic block, wherein the block copolymer comprises from 75 to 95 mol-% of at least one hydrophilic block and from 5 to 25 mol-% of at least one hydrophobic block, based on the total amount (mol) of the block copolymer in the dry state and wherein the glass transition temperature of the at least one hydrophobic block is in the range of about −80° C. and to about 0° C.

Within the context of this disclosure "dry state" means that the block copolymer comprises less than 2% by weight of water, in an embodiment less than 1% by weight of water, in an embodiment less than 0.5% by weight of water, wherein the percentages by weight are based on the total weight of the block copolymer and the water comprised.

A further subject-matter of this disclosure is an electrode system for measuring the concentration of an analyte under in-vivo conditions, comprising an electrode with immobilized enzyme molecules and a diffusion barrier that controls diffusion of the analyte from the exterior of the electrode system to the enzyme molecules, characterized in that the diffusion barrier comprises a block copolymer having at least one hydrophilic block and at least one hydrophobic block, wherein the block copolymer comprises from 75 to 95 mol-% of at least a poly(2-hydroxyethyl methacrylate) (polyHEMA) block and from 5 to 25 mol-% of at least a poly-n-butyl acrylate (poly(n-BuA)) block, based on the total amount (mol) of the block copolymer in the dry state.

Preferably, the diffusion barrier comprises a single, i.e., only one block copolymer having at least one hydrophilic block and at least one hydrophobic block, i.e., further polymers or copolymers are absent. More preferably, the diffusion barrier consists of a single block copolymer having at least one hydrophilic block and at least one hydrophobic block.

In a further preferred embodiment the block copolymer of the diffusion barrier is a diblock copolymer or a triblock copolymer. When the block copolymer of this disclosure is a diblock copolymer it is made up of one hydrophilic block and one hydrophobic block. When the block copolymer of this disclosure is a triblock copolymer it is made up of two hydrophilic blocks and one hydrophobic block or of one hydrophilic block and two hydrophobic blocks.

In an embodiment, in a block copolymer in the sense of this disclosure, in the constituent macromolecules adjacent blocks are constitutionally different, i.e., adjacent blocks comprise constitutional units derived from different species of monomer or from the same species of monomer but with a different composition or sequence distribution of constitutional units.

In a further embodiment, a block copolymer is a polymer comprising molecules in which there is a linear arrangement of blocks, a block being defined as a portion of a polymer molecule in which the monomeric units have at least one constitutional or configurational feature absent from the adjacent portions.

The electrode system of this disclosure is suitable for insertion or implantation into a body, e.g., a mammalian body such as a human body. The electrode system is adapted for measuring a desired analyte in body fluid and/or body tissue, e.g., in the extracellular space (interstitium), in blood or lymph vessels or in the transcellular space.

The inserted or implanted electrode system is suitable for short-term application, e.g., 3 to 14 days, or for long-term application, e.g., 6 to 12 months. During the insertion or implantation period a desired analyte may be determined by continuous or discontinuous measurements.

The electrode system of this disclosure is preferably part of an enzymatic, non-fluidic (ENF) sensor, wherein enzymatic conversion of the analyte is determined. Preferably, the sensor comprises a working electrode with immobilized enzyme molecules for the conversion of the analyte which results in the generation of an electrical signal. The enzymes may be present in a layer covering the electrode. Additionally, redox mediators and/or electro-catalysts as well as conductive particles and pore formers may be present. This type of electrode is described, e.g., in WO 2007/147475 and WO 2010/028708, the contents of which are herein incorporated by reference.

The area of the working electrode is the sensitive area of the sensor. This sensitive area is provided with a diffusion barrier that controls diffusion of the analyte from the exterior, e.g., body fluid and/or tissue surrounding the electrode system to the enzyme molecules. The diffusion barrier can, for example, be a cover layer covering the enzyme layer, i.e., an enzyme-free layer. However, it is feasible just as well that diffusion-controlling particles are incorporated into the enzyme layer to serve as a diffusion barrier. For example, pores of the enzyme layer can be filled with the polymer which controls the diffusion of analyte molecules. The thickness of the diffusion barrier is usually from about 5 to 60 µm or about 10 to 50 µm, e.g., from about 10 to 15 µm, or from about 10 to 20 µm, particularly from about 10 to 25 µm or from about 10 to 15 µm (in dry state).

The diffusion barrier of the electrode system of this disclosure comprises a block copolymer, preferably a single block copolymer, having at least one hydrophilic block and at least one hydrophobic block wherein the block copolymer comprises from 75 to 95 mol-% of at least one hydrophilic block and from 5 to 25 mol-% of at least one hydrophobic block, based on the total amount of the block copolymer in the dry state. According to this disclosure, the glass transition temperature of the at least one hydrophobic block is in the range of about −80° C. and about 0° C.

It should be noted that several glass transition temperatures may be identified for one block copolymer, corresponding to the number of blocks. In the block copolymer of this disclosure the glass transition temperature of the hydrophobic block and the glass transition temperature of the hydrophilic block may be determined individually as described below.

The block copolymer may comprise an alternating sequence of blocks, i.e., a hydrophilic block is linked to a hydrophobic block. The hydrophilic and hydrophobic blocks are covalently linked to each other within a polymer molecule. The block copolymer is preferably a diblock copolymer or a triblock copolymer.

The number average molecular weight (Mn) of the block copolymer (by weight) is usually in the range from 20 to 200 kDa, particularly in the range from 25 to 95 kDa and more particularly in the range from 30 to 70 kDa. The number average molecular weight is preferably determined via size exclusion chromatography (SEC) using polymethylmethacrylate (PMMA) as a calibrator.

The number average molecular weight (Mn) of hydrophobic polymers is preferably determined via SEC with tetrahydrofuran (THF) as solvent. The number average molecular weight (Mn) of the block copolymer is determined with dimethylformamide+3 g/L LiCl as solvent. In an embodiment the number average molecular weight of the block copolymer is determined via SEC of the hydrophobic block in THF in combination with NMR measurements.

The molar ratio of the hydrophilic to hydrophobic portions in the block copolymer is usually in the range from about 75 mol % (hydrophilic): 25 mol % (hydrophobic) to about 95 mol % (hydrophilic): 5 mol % (hydrophobic), in the range from >75 mol % (hydrophilic): <25 mol (hydrophobic) to about 95% (hydrophilic): 5 mol % (hydrophobic), in the range from about 80 mol % (hydrophilic): 20 mol % (hydrophobic) to about 90 mol % (hydrophilic): 10 mol % (hydrophobic) or in the range from about 85 mol % (hydrophilic): 15 mol (hydrophobic).

In other words the block copolymer in an embodiment comprises in the range from 75 to 95 mol-% of the at least one hydrophilic block and in the range from 5 to 25 mol-% of the at least one hydrophobic block, based on the total amount (mol) of the block copolymer. In an embodiment the block copolymer comprises in the range from >75 to 95 mol-% of the at least one hydrophilic block and in the range from 5 to <25 mol-% of the at least one hydrophobic block, based on the total amount (mol) of the block copolymer. In an embodiment the block copolymer comprises in the range from 80 to 90 mol-% of the at least one hydrophilic block and in the range from 10 to 20 mol-% of the at least one hydrophobic block, based on the total amount (mol) of the block copolymer. In an embodiment the block copolymer comprises in the range from 84 to 86 mol-% of the at least one hydrophilic block and in the range from 14 to 16 mol-% of the at least one hydrophobic block, based on the total amount (mol) of the block copolymer.

The mol-% of the hydrophilic block and the hydrophobic block in the block copolymer in an embodiment add up to 100 mol-%.

A hydrophilic block of the block copolymer of this disclosure preferably consists of at least 90 mol-%, at least 95 mol-%, based on the total amount (mol) of the hydrophilic block, of hydrophilic monomeric units. Particularly preferably the hydrophilic block of the block copolymer consists of hydrophilic monomeric units. It usually has a length (chain length) of from 150 to 900, e.g., from 150 to 500, or from 200 to 800 particularly from 175 to 450, or from 300 to 600 monomeric molecules.

The hydrophilic block preferably has a weight average molecular weight (Mw), which is above the entanglement molecular weight ($M_e$) of the hydrophilic block. The entanglement molecular weight is the molecular weight at which the polymer chains start to form a loop on itself (R. P. Wool, Macromolecules 26 (1993), 1564-1569). At this molecular weight the Rouse-model describing the conformational dynamics of an ideal polymer chain does not fit anymore (Rouse, J. Chem. Phys. 21 (1953), 1272 ff.). For example, the entanglement molecular weight ($M_e$) of the hydrophilic block may be in the range from 10 to 80 kDa, preferably in the range from 20 to 30 kDa. Further, the hydrophilic block preferably has a weight average molecular weight (Mw) of 24000 g/mol or higher, preferably in the range of about 24000 g/mol to about 90000 g/mol. The weight average molecular weight (Mw) can be determined via size exclusion chromatography (SEC) as described above for the number average molecular weight (Mn).

A hydrophobic block of the copolymer of this disclosure preferably consists of at least 90 mol-%, more particularly at least 95 mol-%, based on the total amount of the hydrophobic block, of hydrophobic monomeric units. Particularly preferably the hydrophobic block of the block copolymer consists of hydrophobic monomeric units. It has usually a length (chain length) of from 20 to 300, e.g., from 20 to 200, or from 50 to 250, particularly from 50 to 100, or from 80 to 150 monomeric units.

The hydrophobic block preferably has a weight average molecular weight (Mw), which is below the entanglement molecular weight ($M_e$) of the hydrophobic block. For the entanglement molecular weight ($M_e$) of the hydrophobic block the definitions as described above for the entanglement molecular weight ($M_e$) of the hydrophilic block hold true. For example, the entanglement molecular weight ($M_e$) of the hydrophobic block is in the range from 10 to 100 kDa, preferably in the range from 10 to 20 kDa. Moreover, the hydrophobic block preferably has a weight average molecular weight (Mw) of 19000 g/mol or less, preferably in the range of about 5000 g/mol to about 16000 g/mol. The weight average molecular weight (Mw) can be determined via size exclusion chromatography (SEC) as described above for the number average molecular weight (Mn).

The ratio of the chain length of the hydrophilic block and chain length of the hydrophobic of the block copolymer is preferably in the range of 2:1 to 20:1 or in the range of 3:1 to 10:1, preferably in the range of 4:1 to 8:1.

The hydrophilic blocks and/or the hydrophobic blocks preferably consist of (meth)acrylic-based monomeric units. More preferably, both the hydrophilic blocks and the hydrophobic blocks consist of (meth)acrylic-based monomeric units.

The term (meth)acrylic-based monomeric units within the context of this disclosure comprises methacrylic-based monomeric units as well as acrylic-based monomeric units.

The hydrophobic monomeric units of the hydrophobic block are preferably selected from hydrophobic acrylic and/or methacrylic units or combinations thereof. Preferably the hydrophobic monomeric units are selected from hydrophobic (meth)acryl esters, e.g., esters having an alcohol portion with 1-12 C-atoms without hydrophilic group, e.g., a $C_1$-$C_{12}$ alkyl acrylate, preferably a $C_4$-$C_{12}$ alkyl acrylate or a $C_6$-$C_{12}$ alkyl methacrylate.

In an embodiment, the hydrophobic monomeric units of the hydrophobic block are selected from hydrophobic acrylic and/or methacrylic units.

Specific examples of monomeric units for the hydrophobic block are selected from:
- ethyl acrylate (EA),
- n- or i-propyl acrylate,
- n/sec or i-butyl acrylate (n-BuA/sec-BuA or i-BuA),
- 3-pentyl acrylate,
- n-pentyl acrylate,
- n-hexyl acrylate,
- n-hexyl methacrylate,
- 2-ethylhexyl acrylate,
- 2-ethylhexyl methacrylate,
- n-heptyl acrylate,
- n-heptyl methacrylate,
- n-octyl acrylate,
- n-octyl methacrylate,
- n-nonyl acrylate,
- n-nonyl methacrylate,
- n/iso-decyl methacrylate,
- n-dodecyl methacrylate,
- n-dodecyl acrylate
- and combinations thereof.

A preferred hydrophobic monomer is n-butyl acrylate (n-BuA). More preferably the hydrophobic block consist of a homopolymer of a single hydrophobic monomeric unit, e.g., a homopolymer of n-butyl acrylate (n-BuA).

The glass transition temperature of the hydrophobic block of this disclosure in its dry state is in the range between about −80° C. and about 0° C. Preferably the glass transition temperature of the hydrophobic block is in the range of about −80° C. to about −20° C., in the range of about −70° C. to about −30° C., or preferably in the range of about −60° C. to about −40° C. The glass transition temperature of the hydrophobic block may be measured with differential scanning calorimetry (DSC) at a temperature change of 10° C./min at atmospheric pressure under nitrogen flow involving two heating steps wherein the second heating step is used to determine the glass transition temperature. The DSC measurements may be performed with a DSC1 device from Mettler-Toledo. Suitable DSC-conditions are described in Table 1.

TABLE 1

| Steps: | Ramp: | Nitrogen: |
|---|---|---|
| 1. Heating Step: 30.0-150.0° C.; | 10.00° C./min | 20.0 ml/min |
| 2. Hold: 150.0° C. 5.0 min | 0.00° C./min | 20.0 ml/min |
| 3. Cooling Step: 150.0--80.0° C. | −10.00° C./min | 20.0 ml/min |
| 4. Hold: −80.0° C. 5.0 min | 0.00° C./min | 20.0 ml/min |
| 5. Heating: −80.0-160.0° C. | 10.00° C./min | 20.0 ml/min |

The hydrophobicity of the hydrophobic block can be determined with a contact angle meter, e.g., Kyowa Interface Science Ltd., model CA-A. Polymer coated glass sheets are placed into the contact angle meter. Three to five water droplets are sequentially placed on the polymer surface and the contact angles are measured within one to three minutes for each droplet. The hydrophobic block preferably has a contact angle in the range from 70° to 115° measured according to the above described method (Okouchi et al., Macromolecules 39 (2006), 1156-1159).

The hydrophilic monomeric units of the hydrophilic block are preferably selected from hydrophilic (meth)acryl esters, i.e., esters with a polar, e.g., OH and/or $OCH_3$ within the alcohol portion of the ester, hydrophilic (meth)acrylamides with an amide (—$NH_2$) or an N-alkyl- or N,N-dialkylamide group, wherein the alkyl group comprises 1 to 2 C-atoms and optionally hydrophilic groups such as OH and/or $OCH_3$ and suitable (meth)acrylic units having a charged, e.g., an anionic or cationic group, such as acrylic acid (acrylate) or methacrylic acid (methacrylate). Further, combinations of monomeric units may be employed.

Specific examples of preferred monomeric units for the hydrophilic block are selected from:
- 2-hydroxyethyl acrylate,
- 2-hydroxyethyl methacrylate (HEMA),
- 2-methoxyethyl acrylate,
- 2-methoxyethyl methacrylate,
- 2- or 3-hydroxypropyl acrylate,
- 2- or 3-hydroxypropyl methacrylate (2- or 3-HPMA),
- 2- or 3-methoxypropyl acrylate,
- 2- or 3-methoxypropyl methacrylate,
- 1- or 2-glycerol acrylate,
- 1- or 2-glycerol methacrylate,
- acrylamide,
- methacrylamide,
- an N-alkyl- or N,N-dialkyl acrylamide, and
  - an N-alkyl- or N,N-dialkyl methacrylamide, wherein alkyl comprises 1 C-atom such as methyl,
- acrylic acid (acrylate),
- methacrylic acid (methacrylate),
- 2-(2-methoxyethoxy)ethylmethacrylate,
- 2-(2-methoxyethoxy)ethylacrylate,
- 2-(2-hydroxyethoxy)ethylacrylate,
- 2-(2-hydroxyethoxy)ethylmethacrylate,
- and combinations thereof.

Preferred hydrophilic monomers are 2-hydroxyethyl methacrylate (HEMA) and/or 2- or 3-hydroxypropyl methacrylate (2- or 3-HPMA). The hydrophilic block may consist of one or more different hydrophilic monomeric units. For example, it may be a random copolymer of at least two different hydrophilic monomeric units such as HEMA and 2-HPMA. Most preferably, the hydrophilic block consists of a homopolymer of a single hydrophilic monomeric unit, for example of a homopolymer of HEMA or 2-HPMA.

The glass transition temperature (Tg) of the hydrophilic block of the block copolymer of this disclosure is preferably about 100° C. or above, e.g., in the range of about 100° C. to about 250° C. or in the range of about 150° C. to about 200° C. Preferably the glass transition temperature (Tg) of the hydrophilic block is in the range of about 105° C. to about 140° C. or in the range of about 110° C. to about 120° C. The glass transition temperature (Tg) of the hydrophilic block may be measured with DSC at a temperature change of 10° C./min at atmospheric pressure under nitrogen flow involving two heating steps wherein the second heating step is used to determine the glass transition temperature (Tg). The DSC measurements may be performed as described above.

In order to introduce ionic groups into the monomer, charged monomeric units such as acrylic acid (acrylate) and/or methacrylic acid (methacrylate) may be incorporated into the hydrophilic block. Thus, in a particular embodiment of this disclosure, the hydrophilic block can be made from at least one non-ionic hydrophilic monomeric unit (e.g., as described above) and from at least one ionic hydrophilic monomeric unit, wherein the ionic monomeric unit is present in a molar amount of preferably 1 to 20 mol-%, based on the total amount of the hydrophilic block. In case the hydrophilic block comprises an ionic monomeric unit such as acrylic acid or methacrylic acid, copolymerization with a hydrophilic monomer selected from the group of (meth) acrylamides, particularly N,N-dialkyl acryl- or methacryl-amides is preferred.

The difference between the glass transition temperature (Tg) of the hydrophilic block and of the hydrophobic block of the copolymer of this disclosure is preferably at least about 100° C., e.g., about 120° C. to about 250° C.

The block copolymers used in this disclosure may be manufactured according to known methods (Böker et al., Macromolecules 34 (2001), 7477-7488.), e.g., by atom transfer radical polymerisation (ATRP).

The block copolymers may be applied to the electrode system by usual techniques, e.g., by providing a solution of the block copolymer in a suitable solvent or solvent mixture, e.g., an organic solvent, such as ether, which is applied to the prefabricated electrode system and dried thereon.

In addition to the block copolymer the diffusion barrier may also comprise further components, particularly non-polymeric components, which may be dispersed and/or dissolved in the block copolymer. These further compounds include plasticizers, particularly biocompatible plasticizers, such as tri-(2-ethylhexyl) trimellitate and/or glycerol.

The diffusion barrier of this disclosure has a high effective diffusion coefficient $D_{eff}$ for glucose which is preferably $\geq 10^{-10}$ cm$^2$/s, more preferably $\geq 5 \cdot 10^{-10}$ cm$^2$/s, and even more preferably $\geq 10^{-9}$ cm$^2$/s, and, e.g., up to $10^{-7}$ or $10^{-8}$ cm$^2$/s at a temperature of 37° C. and a pH of 7.4. The effective diffusion coefficient is preferably determined as described in Example 4 according to the equation:

$$D_{eff} = SE_m/F \cdot L_m \cdot 5.182 \cdot 10^{-8}$$

in cm$^2$/s, wherein $SE_m$ is the sensitivity of the working electrode, F is the total area of the working electrode spots, and $L_m$ is the layer thickness of the diffusion barrier. $SE_m$ and $L_m$ may be determined as described in the Examples.

Moreover, the diffusion barrier of this disclosure has a low sensor drift. In preferred embodiments the sensor of this disclosure has an in vitro sensor drift in the range from −1.5%/d to 1.5%/d or in the range from −1.0%/d to 1.0%/d, more preferably in the range from −0.5%/d to 0.5%/d.

Furthermore, due to the low glass transition temperature of the hydrophobic block, the diffusion barrier of this disclosure shows an excellent mechanical stability and flexibility as well as good adhesion properties.

The diffusion coefficient for the analyte may be adjusted to a desired value by selecting block copolymers with appropriate molecular weights and/or hydrophobic blocks with appropriate length and/or hydrophobicity. This, in association with an improved sensor drift, allows the manufacturing of small sensors and/or the use of sensors comprising working electrodes with low enzyme load.

The electrode system of this disclosure is suitable for measuring the concentration of an analyte under in-vivo conditions, i.e., when inserted or implanted into a body. The analyte may be any molecule or ion present in tissue or body fluid, for example oxygen, carbon dioxide, salts (cations and/or anions), fats or fat components, carbohydrates or carbohydrate components, proteins or protein components, or other type of biomolecules. Especially preferred is the determination of analytes which can be efficiently transferred between body fluid, e.g., blood and tissue such as oxygen, carbon dioxide, sodium cations, chloride anions, glucose, urea, glycerol, lactate and pyruvate.

The electrode system comprises an enzyme immobilized on an electrode. The enzyme is suitable for the determination of a desired analyte. Preferably, the enzyme is capable of catalytically converting the analyte and thereby generating an electric signal detectable by the electric conductor of the working electrode. The enzyme for measuring the analyte is preferably an oxidase, for example glucose oxidase or lactate oxidase or a dehydrogenase, for example a glucose dehydrogenase or a lactate dehydrogenase. In addition to the enzyme, the enzyme layer may also comprise an electro-catalyst or a redox mediator which favors the transfer of electrons to conductive components of the working electrode, e. g. graphite particles. Suitable electro-catalysts are metal oxides such as manganese dioxide or organo-metallic compounds such as cobalt phthalo-cyanine. In a preferred embodiment the redox mediator is capable of degrading hydrogen peroxide thereby counteracting depletion of oxygen in the surroundings of the working electrode. In a different embodiment, a redox mediator may be covalently bound to the enzyme and thereby effect direct electron transfer to the working electrode. Suitable redox mediators for direct electron transfer are prosthetic groups, such as pyrrolo quinoline quinone (PQQ), flavine adenine dinucleotide (FAD) or other known prosthetic groups. Enzymes immobilized on electrodes are, e.g., described in WO 2007/147475, the content of which is herein incorporated by reference.

A preferred embodiment of the electrode system comprises a counter electrode with an electrical conductor and a working electrode with an electrical conductor on which an enzyme layer that contains immobilised enzyme molecules and the diffusion barrier are arranged. The enzyme layer is preferably designed in the form of multiple fields that are arranged on the conductor of the working electrode at a distance, e.g., at least 0.3 mm or at least 0.5 mm from each other. The individual fields of the working electrode may form a series of individual working electrodes. Between these fields, the conductor of the working electrode may be covered by an insulation layer. By arranging the fields of the enzyme layer on the top of openings of an electrically insulating layer, the signal-to-noise ratio can be improved.

According to a preferred embodiment the enzyme layer and the diffusion layer are further covered by a spacer membrane. Such an arrangement is disclosed in WO 2010/028708, WO 2012/130841 and WO 2013/144255, the contents of which are herein incorporated by reference.

The electrode system of this disclosure may additionally comprise a reference electrode capable of supplying a reference potential for the working electrode, e.g., an Ag/AgCl reference electrode. Moreover, an electrode system according to this disclosure can have additional counter- and/or working electrodes.

The electrode system may be part of a sensor, e.g., by being connected to a potentiostat and an amplifier for amplification of measuring signals of the electrode system. The sensor is preferably an enzymatic non-fluidic (ENF) sensor, more preferably an electrochemical ENF sensor. The electrodes of the electrode system may be arranged on a substrate that carries the potentiostat or be attached to a circuit board that carries the potentiostat. Hence, a further subject-matter of this disclosure is a sensor which is insertable or implantable into a body and which comprises an electrode system with a diffusion membrane as described above. In a very preferred embodiment the sensor is for the measurement of an analyte under in-vivo conditions. Especially preferred the sensor is for the measurement of glucose.

A further subject-matter of this disclosure is related to the use of a block copolymer having at least one hydrophilic block and at least one hydrophobic block as a diffusion barrier for an enzymatic electrode. The block copolymer is preferably as described above, e.g., a single block-copolymer. The diffusion barrier and the enzymatic electrode are preferably also as described above.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
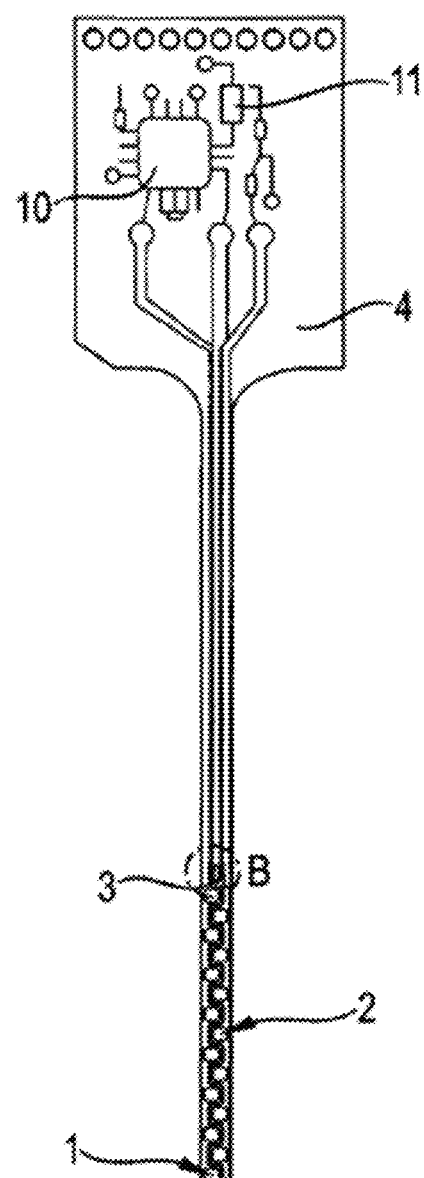
FIG. 1 shows an exemplary embodiment of an electrode system according to this disclosure.
Figure 2:
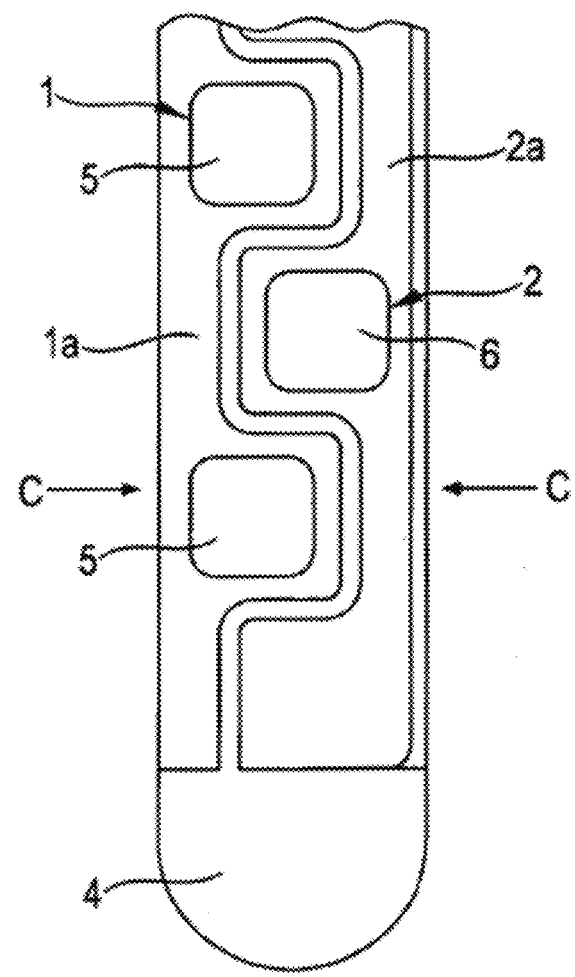
FIG. 2 shows a detail view of FIG. 1.
Figure 3:
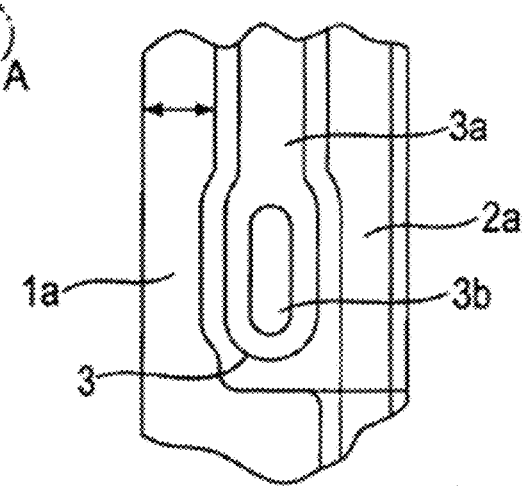
FIG. 3 shows another detail view of FIG. 1.
Figure 4:
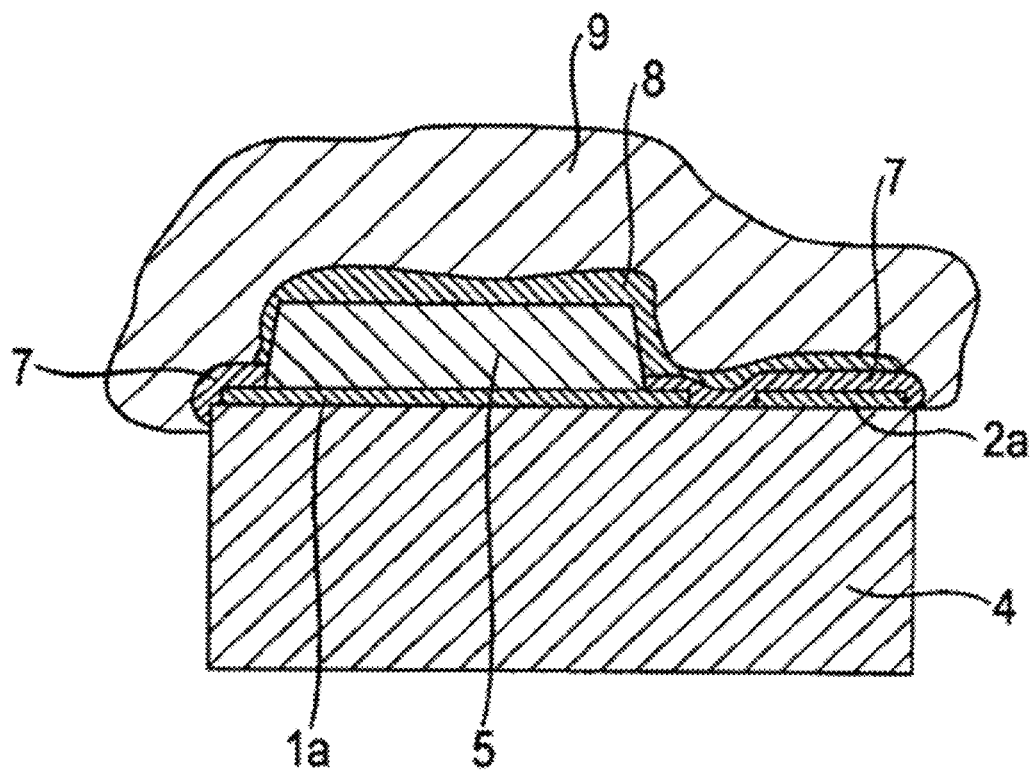
FIG. 4 shows a section along the section line CC of FIG. 2.

FIG. 1 shows an exemplary embodiment of an electrode system for insertion into body tissue of a human or animal, for example into cutis or subcutaneous fatty tissue. A magnification of detail view A is shown in FIG. 2, a magnification of detail view B is shown in FIG. 3. FIG. 4 shows a corresponding sectional view along the section line, CC, of FIG. 2.

The electrode system shown has a working electrode 1, a counter electrode 2, and a reference electrode 3. Electrical conductors of the electrodes 1a, 2a, 3a are arranged in the form of metallic conductor paths, preferably made of palladium or gold, on a substrate 4. In the exemplary embodiment shown, the substrate 4 is a flexible plastic plate, for example made of polyester. The substrate 4 is less than 0.5 mm thick, for example 100 to 300 micrometres (μm), and is therefore easy to bend such that it can adapt to movements of surrounding body tissue after its insertion. The substrate 4 has a narrow shaft for insertion into body tissue of a patient and a wide head for connection to an electronic system that is arranged outside the body. The shaft of the substrate 4 preferably is at least 1 cm in length, in particular 2 cm to 5 cm.

In the exemplary embodiment shown, one part of the measuring facility, namely, the head of the substrate, projects from the body of a patient during use. Alternatively, it is feasible just as well, though, to implant the entire measuring facility and transmit measuring data in a wireless fashion to a receiver that is arranged outside the body. The working electrode 1 carries an enzyme layer 5 that contains immobilized enzyme molecules for catalytic conversion of the analyte. The enzyme layer 5 can be applied, for example, in the form of a curing paste of carbon particles, a polymeric binding agent, a redox mediator or an electro-catalyst, and enzyme molecules. Details of the production of an enzyme layer 5 of this type are disclosed, for example, in WO 2007/147475, reference to which is be made in this context.

In the exemplary embodiment shown, the enzyme layer 5 is not applied continuously on the conductor 1a of the working electrode 1, but rather in the form of individual fields that are arranged at a distance from each other. The individual fields of the enzyme layer 5 in the exemplary embodiment shown are arranged in a series.

The conductor 1a of the working electrode 1 has narrow sites between the enzyme layer fields that are seen particularly well in FIG. 2. The conductor 2a of the counter electrode 2 has a contour that follows the course of the conductor 1a of the working electrode 1. This means results in an intercalating or interdigitated arrangement of working electrode 1 and counter electrode 2 with advantageously short current paths and low current density.

In order to increase its effective surface, the counter electrode 2 can be provided with a porous electrically conductive layer 6 that is situated in the form of individual fields on the conductor 2a of the counter electrode 2. Like the enzyme layer 5 of the working electrode 1, this layer 6 can be applied in the form of a curing paste of carbon particles and a polymeric binding agent. The fields of the layer 6 preferably have the same dimensions as the fields of the enzyme layer 5, although this is not obligatory. However, measures for increasing the surface of the counter electrode can just as well be foregone and the counter electrode 2 can just as well be designed to be a linear conductor path with no coatings of any kind, or with a coating made from the described block copolymer and optionally a spacer.

The reference electrode 3 is arranged between the conductor 1a of the working electrode 1 and the conductor 2a of the counter electrode 2. The reference electrode shown in FIG. 3 consists of a conductor 3a on which a field 3b of conductive silver/silver chloride paste is arranged.

FIG. 4 shows a schematic sectional view along the section line, CC, of FIG. 2. The section line, CC, extends through one of the enzyme layer fields 5 of the working electrode 1 and between the fields of the conductive layer 6 of the counter electrode 2. Between the fields of enzyme layer 5, the conductor 1a of the working electrode 1 can be covered with an electrically insulating layer 7, like the conductor 2a of the counter electrode 2 between the fields of the conductive layers 6, in order to prevent interfering reactions which may otherwise be catalysed by the metal of the conductor paths 1a, 2a. The fields of the enzyme layer 5 are therefore situated in openings of the insulation layer 7. Likewise, the fields of the conductive layer 6 of the counter electrode 2 may also be placed on top of openings of the insulation layer 7.

The enzyme layer 5 is covered by a cover layer 8 which presents a diffusion resistance to the analyte to be measured and therefore acts as a diffusion barrier. The diffusion barrier 8 consists of a single copolymer with alternating hydrophilic and hydrophobic blocks as described above.

A favorable thickness of the cover layer 8 is, for example, 5 to 60 µm, particularly from about 10 to 125 µm or from about 10 to 15 µm. Because of its diffusion resistance, the cover layer 8 causes fewer analyte molecules to reach the enzyme layer 5 per unit of time. Accordingly, the cover layer 8 reduces the rate at which analyte molecules are converted, and therefore counteracts a depletion of the analyte concentration in surroundings of the working electrode.

The cover layer 8 extends continuously essentially over the entire area of the conductor 1a of the working electrode 1. On the cover layer 8, a biocompatible membrane may be arranged as spacer 9 that establishes a minimal distance between the enzyme layer 5 and cells of surrounding body tissue. This means advantageously generates a reservoir for analyte molecules from which analyte molecules can get to the corresponding enzyme layer field 5 in case of a transient disturbance of the fluid exchange in the surroundings of an enzyme layer field 5. If the exchange of body fluid in the surroundings of the electrode system is transiently limited or even prevented, the analyte molecules stored in the spacer 9 keep diffusing to the enzyme layer 5 of the working electrode 1 where they are converted. The spacer 9 therefore causes a notable depletion of the analyte concentration and corresponding falsification of the measuring results to occur only after a significantly longer period of time. In the exemplary embodiment shown, the membrane forming the spacer 9 also covers the counter electrode 2 and the reference electrode 3.

The spacer membrane 9 can, for example, be a dialysis membrane. In this context, a dialysis membrane is understood to be a membrane that is impermeable for molecules larger than a maximal size. The dialysis membrane can be prefabricated in a separate manufacturing process and may then be applied during the fabrication of the electrode system. The maximal size of the molecules for which the dialysis membrane is permeable is selected such that analyte molecules can pass, while larger molecules are retained.

Alternatively, instead of a dialysis membrane, a coating made of a polymer that is highly permeable for the analyte and water, for example on the basis of polyurethane or of acrylate, can be applied over the electrode system as spacer membrane 9.

Preferably, the spacer membrane is made from a copolymer of (meth)acrylates. Preferably, the spacer membrane is a copolymer from at least 2 or 3 (meth)acrylates. More preferably, the spacer membrane comprises more than 50 mol-%, at least 60 mol-% or at least 70 mol-% hydrophilic monomer units, e.g., HEMA and/or 2-HPMA, and up to 40 mol-% or up to 30 mol-% hydrophilic units, e.g., BUMA (butylmethacrylate) and/or MMA (methylmethacrylate) based on the total amount of spacer membrane, e.g., as described in WO 2012/130841 and WO 2013/144255. To the person skilled in the art it is clear that the spacer membrane is different from the diffusion barrier. The spacer membrane may be a random or block copolymer. An especially preferred spacer membrane comprises MMA or BUMA as hydrophobic moieties and 2-HEMA and/or 2-HPMA as hydrophilic moieties. The spacer membrane is highly permeable for the analyte, i.e., it does significantly lower the sensitivity per area of the working electrode, for example 20% or less, or 5% or less with a layer thickness of less than about 20 µm, preferably less than about 5 µm. An especially preferred thickness of the spacer membrane is from about 1 µm to about 3 µm.

The enzyme layer 5 of the electrode system can contain metal oxide particles, preferably manganese dioxide particles, as catalytic redox mediator. Manganese dioxide catalytically converts hydrogen peroxide that is formed, for example, by enzymatic oxidation of glucose and other bioanalytes. During the degradation of hydrogen peroxide, the manganese dioxide particles transfer electrons to conductive components of the working electrode 1, for example to graphite particles in the enzyme layer 5. The catalytic degradation of hydrogen peroxide counteracts any decrease of the oxygen concentration in the enzyme layer 5. Advantageously this allows the conversion of the analyte to be detected in the enzyme layer 5 to not be limited by the local oxygen concentration. The use of the catalytic redox mediator therefore counteracts a falsification of the measuring result by the oxygen concentration being low. Another advantage of a catalytic redox mediator is that it prevents the generation of cell-damaging concentrations of hydrogen peroxide.

The preferred spacer membrane polymer described herein may be used as an outer coating for a diffusion barrier of this disclosure, but also as an outer coating of an electrode system in general, particularly of an electrode system for measuring the concentration of an analyte under in-vivo conditions, comprising an electrode with immobilized enzyme molecules and a diffusion barrier that controls diffusion of the analyte from the exterior of the electrode system to the enzyme molecules.

Thus, this disclosure provides an electrode system for measuring the concentration of an analyte under in-vivo conditions, comprising an electrode with immobilized enzyme molecules and preferably a diffusion barrier that controls diffusion of the analyte from the exterior of the electrode system to the enzyme molecules, characterized in that a spacer membrane forms at least a portion of the outer layer of the electrode system, wherein the spacer membrane comprises a hydrophilic copolymer of acrylic and/or methacrylic monomers, wherein the polymer comprises more than 50 mol-% hydrophilic monomers.

The features of this embodiment particularly with regard to the structure of the electrode system, the analyte and the enzyme molecules are as described herein. The diffusion barrier is preferably based on acrylic and/or methacrylic monomers as described herein, it may however also have a different composition.

The outer spacer membrane preferably covers at least the working electrode portion comprising the enzyme molecules and optionally also other portions, e.g., the counter electrode.

Example 1

Permeability of an Enzymatic Non-fluidic (ENF) Glucose Sensor with Distributed Electrodes for Transcutaneous Implantation Having a Diffusion Layer Consisting of One Single Block Copolymer The sensor was built on a prefabricated palladium strip conductor structure on a polyester substrate having a thickness of 250 µm. Working electrode (WE) and counter electrode (CE) were arranged distributed (as shown in FIGS. 1-2).

The fields of the CE were overprinted with carbon paste, the rest of the strip conductor was insulated. The fields of the WE were overprinted with a mixture of cross-linked glucose oxidase (enzyme), conductive polymer paste and electric catalyst, here manganese (IV)-oxide (Technipur). The remaining paths of the strip conductor were again insulated. The reference electrode (RE) consists of Ag/AgCl paste. The electrodes cover about 1 cm of the sensor shaft.

The WE-fields were coated with a block copolymer diffusion layer consisting of a HEMA block and a n-BuA block. The thickness of the layer is between 20 and 50 µm.

Three sensor batches were produced, each coated with a specific block copolymer as diffusion layer (see Table 2 hereinbelow). All block copolymers were obtained from Polymer Source, Montreal and TU Darmstadt and are listed in the following Table 2.

TABLE 2

| Name | | Monomeric units | | Number average Molecular weight (Mn) |
|---|---|---|---|---|
| block copolymer | Molar ratio/% nBuA/HEMA | nBuA [n] | HEMA [n] | Copolymer [kDa] |
| A | 45/55 | 220 | 270 | 63 |
| B | 15/85 | 90 | 522 | 79 |
| C | 17/83 | 40 | 190 | 30 |

The respective block copolymer was dissolved in organic solvent (15-18% concentration) and the sensors were coated therewith. After drying in an oven for 1 hour at 50° C. under atmosphere conditions, the coated sensors were tested in-vitro in glucose solutions of different concentrations. Of each sensor batch 4 sensors were measured as random sample. As a measure for the in-vitro sensitivity, the signal was calculated by the difference of the measured currents at 10 mM and 0 mM glucose concentration, which then was divided by 10 mM (cf. Example 4).

Figure 5A:
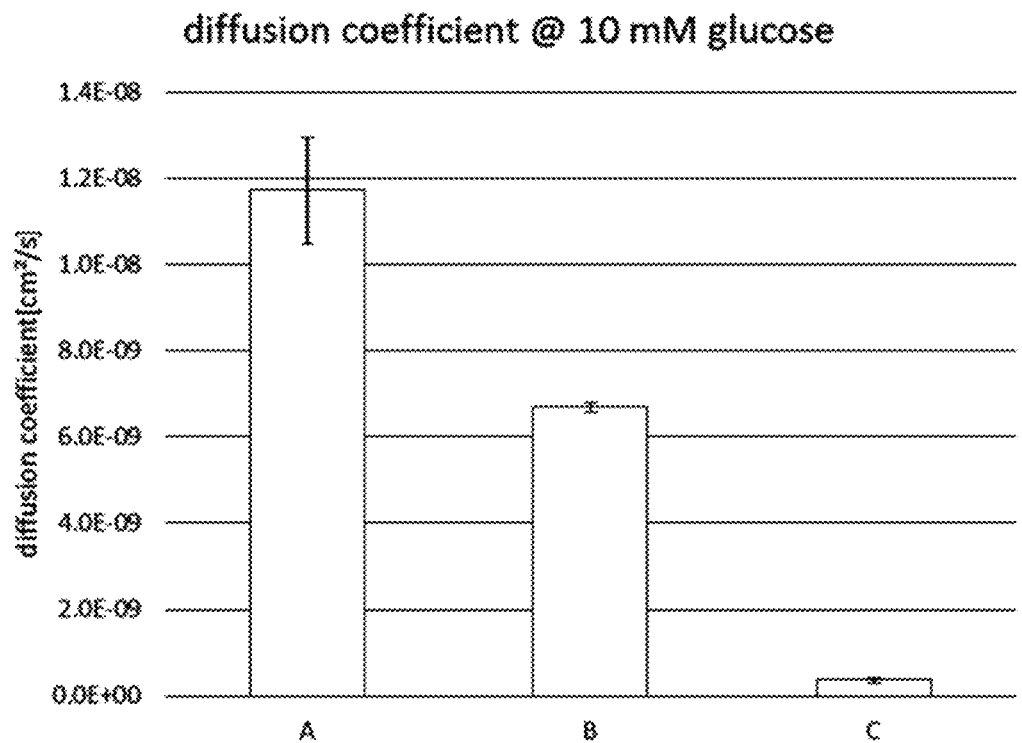
FIG. 5a shows the effective diffusion coefficient (with standard deviation) of three glucose sensors (at 10 mM glucose) provided with different block copolymers (A, B and C) as diffusion membranes.

All sensors were operated at a polarisation voltage of 350 mV versus Ag/AgCl, the measurement temperature was kept constant at 37° C. The sensors used for this measurement series did not comprise the spacer described in WO 2010/028708, which, however, did not make any difference in view of the tested signal level. FIGS. 5a and b show the diffusion coefficient and the sensor drift of the sensors with standard deviations for the three different diffusion layers.

Figure 5B:
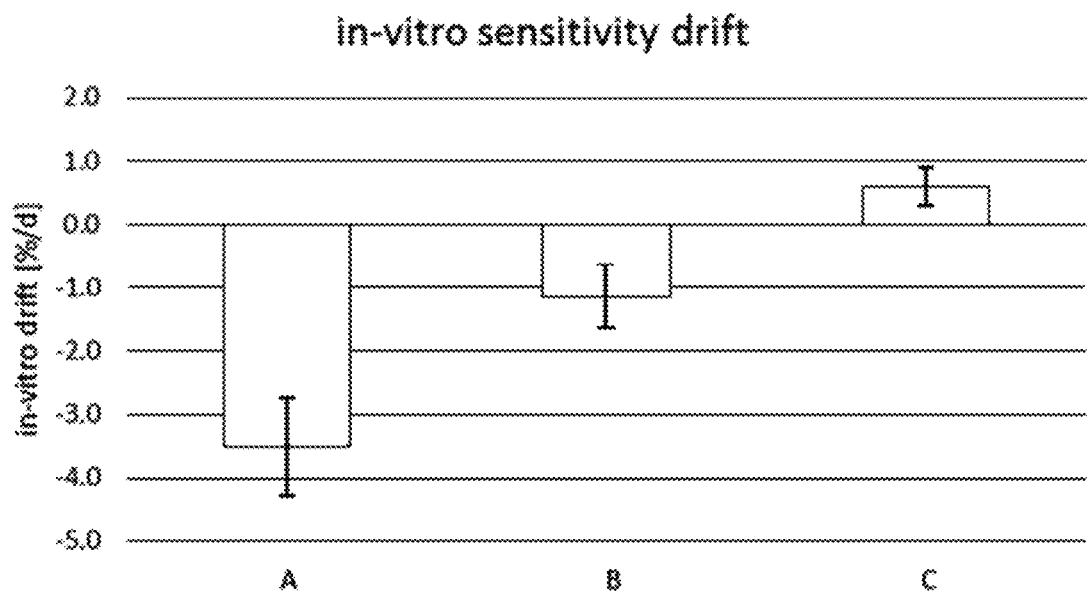
FIG. 5b shows the sensor drift of three glucose sensors provided with different block copolymers (A, B and C) as diffusion membranes.

Block copolymer A represents a comparative block copolymer having a molar ratio of 45:55 (hydrophobic:hydrophilic). It shows a high diffusion coefficient associated with a comparatively high sensor drift (as shown in FIGS. 5a and 5b).

In block copolymer B according to this disclosure, the amount of the hydrophilic HEMA block was increased to 85 mol-% and the hydrophobic nBuA block was reduced to 15 mol-%. Block copolymer B shows a somewhat reduced diffusion coefficient associated with a significantly reduced sensor drift (as shown in FIGS. 5a and 5b).

Block copolymer C essentially corresponds to block copolymer B with respect to the hydrophobic and hydrophilic portions and molar ratios. However, block copolymer C shows a reduced total number average molecular weight (Mn) compared to block copolymer B. This leads to a further reduction of the diffusion coefficient and to a very low, slightly positive, sensor drift (as shown in FIGS. 5a and 5b).

Thus, according to this disclosure, a desired diffusion coefficient for the analyte, e.g., glucose within a broad range can be adjusted. Thereby, a preferred sensitivity range of 1 to 1.5 nA/mM analyte, e.g., glucose may be obtained.

Example 2

Mechanic Flexibility of the Diffusion Layer of an ENF Glucose Sensor

The sensor was manufactured as described in WO 2010/028708, however having a diffusion layer according to this disclosure. It was assumed that the glass transition temperature (Tg) is a substitute parameter for the mechanic flexibility. Further, it was assumed that the glass transition temperature, which may be allocated to the hydrophobic block, determines the mechanic flexibility in in-vivo applications.

The sensors were coated with the diffusion layer of the block copolymer B of this disclosure as described in Example 1 or with a comparative block copolymer Poly (BUMA-r-MMA-b-HEMA) as described in WO 2012/130841 in example 4. The molar ratio of the hydrophobic BUMA-r-MMA block to the hydrophilic HEMA block is 50%:50%, the hydrophobic block contains MMA and BUMA in equal molar amounts in a randomized sequence. The molecular weight is 50 kDa. The glass transition temperature of the randomized hydrophobic block is about 73° C., determined by DSC and a heating rate of 10° C./min.

Both diffusion layers were generated from the respective solution of the copolymers in organic solvent and dried as in Example 1. The thickness of the diffusion layers was approx. 20 µm.

Figure 6:
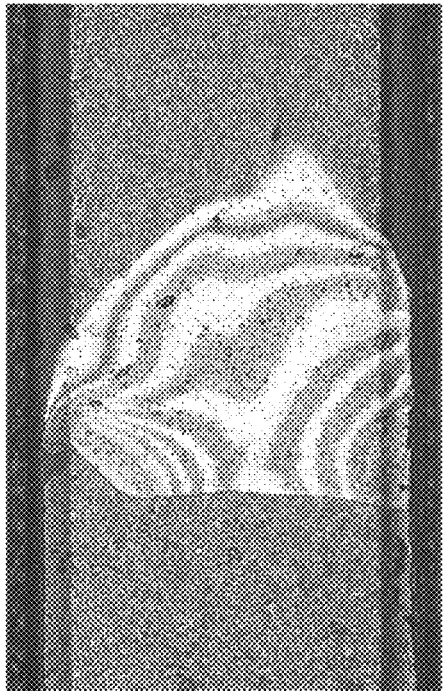
FIG. 6 shows the results of bending tests of glucose sensors provided with the block copolymer B (Poly(nBuA-b-HEMA)) and a comparative block copolymer Poly (BUMA-r-MMA-b-HEMA)
Figure 6:
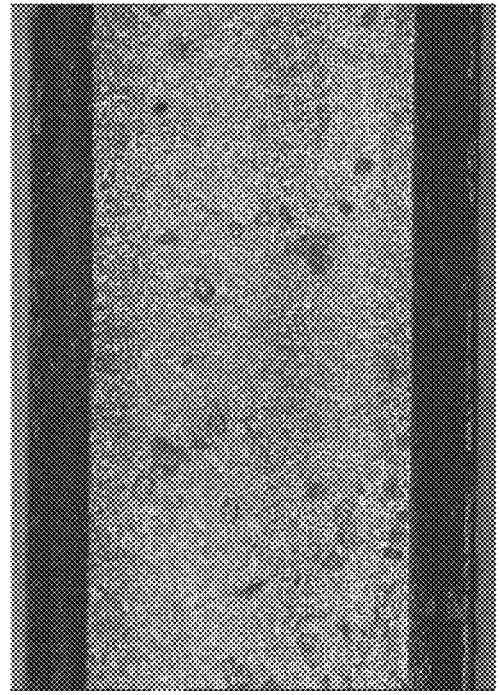

Bending tests on both sensor types with a bending radius of 1 mm were performed by hand. The sensors having a block copolymer B diffusion layer showed no cracks in the diffusion layer. In contrast thereto, under identical test conditions, the sensors having the block copolymer Poly (BUMA-r-MMA-b-HEMA) showed Newton's rings due to a delamination of the diffusion layer (as shown in FIG. 6).

Example 3

Hydrophobicity of the Diffusion Layer of an ENF EC Sensor

The sensors were manufactured as described in WO 2010/028708 with comparative block copolymer D and block copolymer E of this disclosure comprising hydrophilic blocks of HEMA and hydrophobic blocks of Ethyl acrylate (EA) (c.f. Table 3). All test conditions were identical to Example 1.

TABLE 3

| Name | | Monomers | | Number average |
|---|---|---|---|---|
| block copolymer | Molar ratio/% EA/HEMA | EA [n] | HEMA [n] | Molecular weight Mn [kDa] |
| D | 43/57 | 290 | 260 | 63 |
| E | 22/78 | 100 | 350 | 56 |

The sensors coated with the block copolymer D were found to be unstable with regard to the sensor behavior. Thus, no value for the diffusion coefficient or the sensor drift could be measured.

Figure 7A:
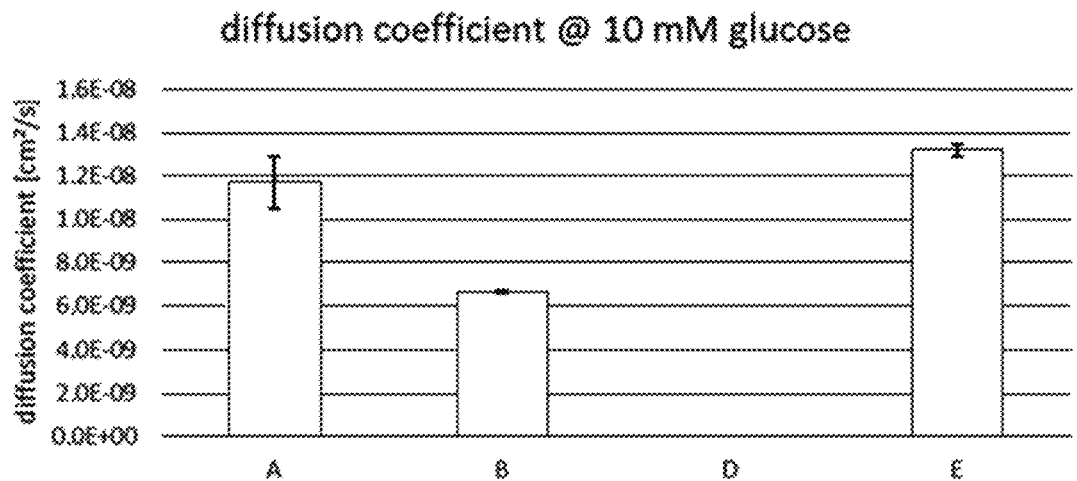
FIG. 7a shows the diffusion coefficient (with standard deviation) of a glucose sensor (at 10 mM glucose) provided with a block copolymer E as diffusion membrane.
Figure 7B:
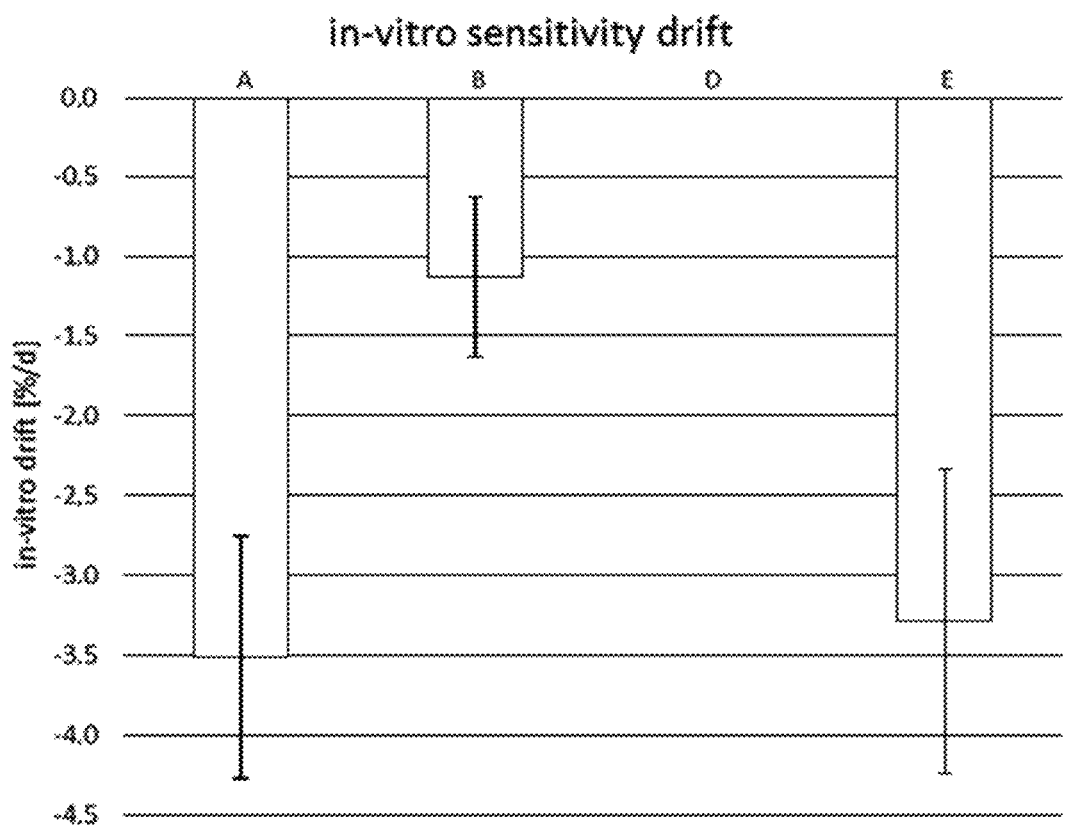
FIG. 7b shows the sensor drift of the glucose sensor provided with the block copolymer E as diffusion membrane.

Instead, a good sensor behavior was observed with block copolymer E, wherein the hydrophilic HEMA fraction was increased to about 80 mol % and the hydrophobic EA fraction was decreased to about 20 mol %. As can be seen in FIGS. 7a and 7b, the block copolymer E shows an increased diffusion coefficient, but also an increased sensor drift as compared to block copolymer B from Example 1. This may be due to the lower hydrophobicity of PolyEA compared to Poly(n-BuA).

Figure 8A:
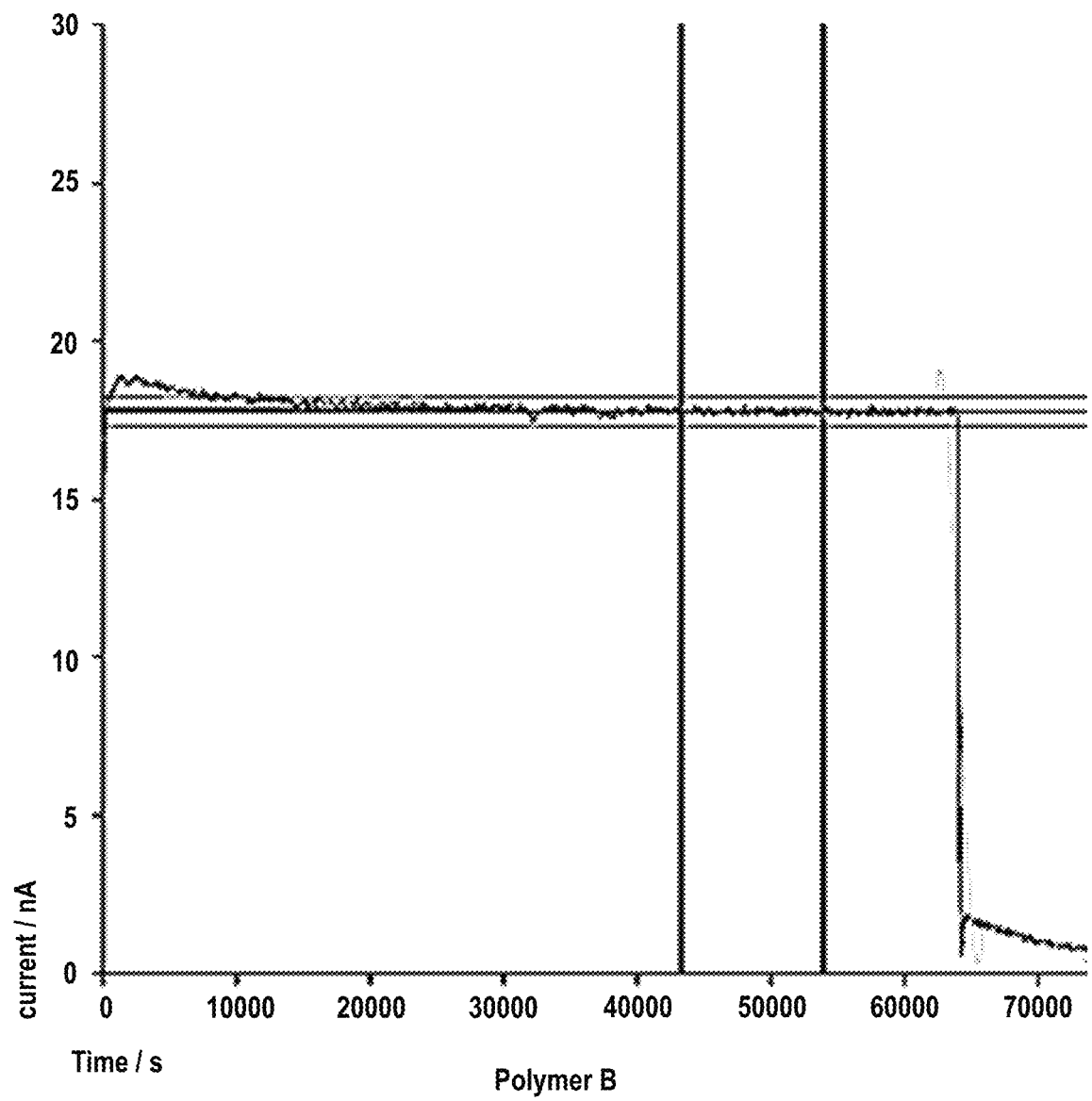
FIGS. 8a and 8b show the conductivity of the block copolymers B and E, respectively, dependent on time.
Figure 8B:
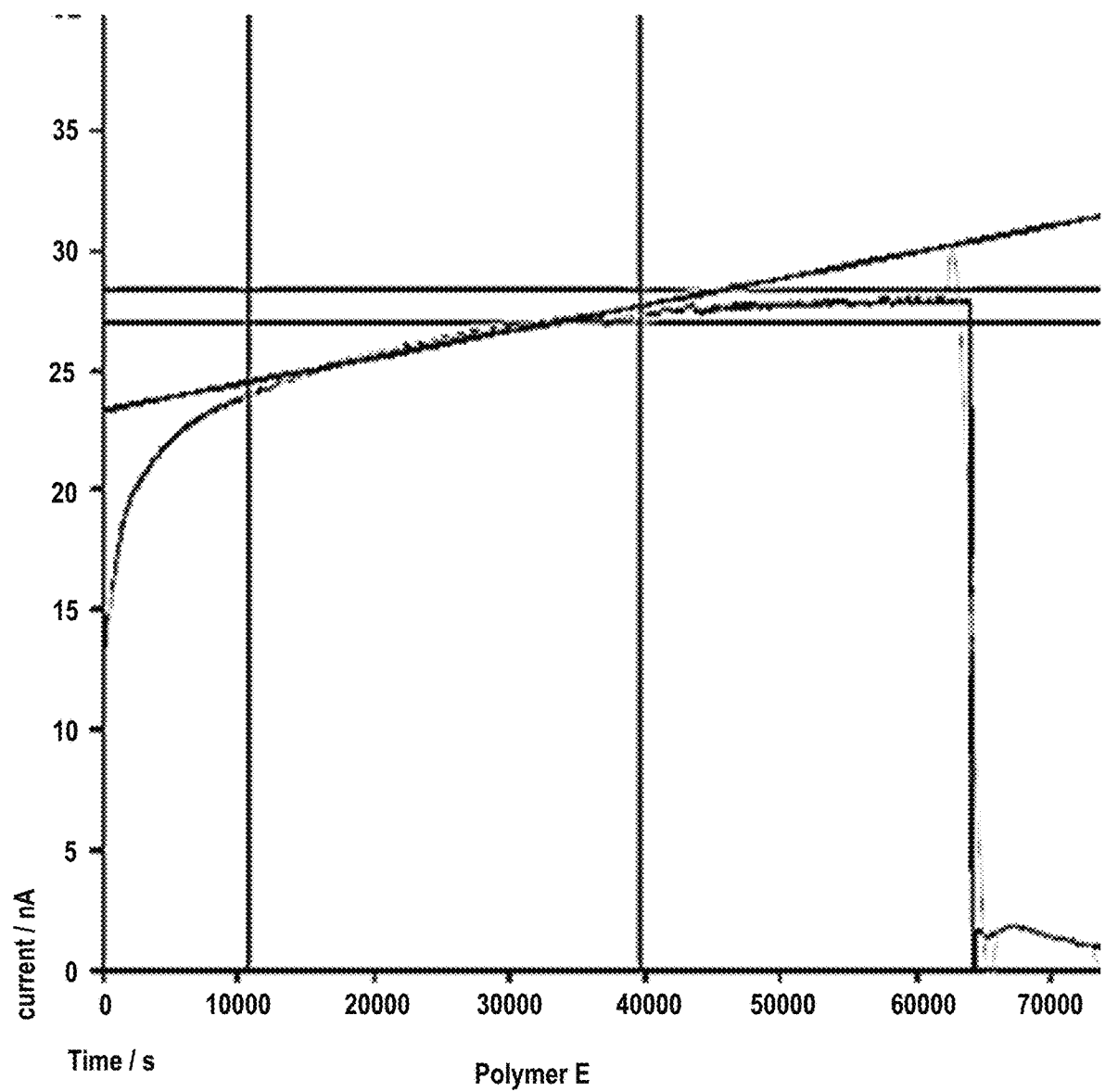

A different behavior of block copolymers B and E was also observed at the start of the measurement. Block copolymer E (Poly(EA-b-HEMA)) was found to have a comparatively long-lasting (24 h) start-up phase as shown in FIG. 8b whereas block copolymer B (Poly(nBuA-b-HEMA)) only shows a very short start-up phase as shown in FIG. 8a.

Example 4

Characterization of the Block Copolymer

A multiple field sensor (10 fields of working electrodes and counter electrodes, respectively) for the continuous measurement of the glucose was produced and characterized in-vitro.

The sensor was provided with a diffusion layer consisting of a block copolymer comprising a hydrophobic block of n-butyl acrylate (n-BuA) and a hydrophilic block of 2-hydroxyethyl methacrylate (HEMA). These polymers correspond to block copolymers B and C of Example 1.

The decisive parameter with regard to the permeability of the diffusion barrier for the analyte is the sensitivity per area unit of the working electrode (i.e., the geometric area). The sensitivity SE is calculated from current (I) measurements at 10 mM and at 0 mM glucose concentration in phosphate-buffered solution (pH 7.4) in nA/mM:

$$SE=[i(10\ mM)-I(0\ mM)]10$$

for each of the analysed sensors. From the individual measurement values (N=8) the mean sensitivity $SE_m$ is determined. The obtained sensitivity values are divided by the microscopically measured geometric total area F of all working electrode spots on the multi-field sensor. Thereby, a sensitivity density $SE_m/F$ is obtained.

The linearity Y of the in-vitro function curve is an indication of the diffusion control functionality of the polymer cover layer on the working electrode. It is calculated from current measurements at 20 mM, 10 mM and 0 mM glucose concentration in %:

$$Y^{20\ mM}=50\cdot[I(20\ mM)-I(0\ mM)]/[I(10\ mM)-I(0\ mM)]$$

for each of the analysed sensors. From the individual measurement values the mean linearity value and its standard deviation are determined.

Finally, the layer thickness L of the diffusion barrier of the sensors is determined by optical measurement for each of the polymers. The corresponding mean values are computed for a sample of n=4 sensors with the same polymer. Therefrom, the effective diffusion coefficient $D_{eff}$ of the cover layer may be calculated:

$$D_{eff}=SE_m/F\cdot L_m\cdot 5.182\cdot 10^{-8}$$

in $cm^2/s$, wherein $SE_m$ and $L_m$ are the respective mean values for the sensitivity and the layer thickness, and F is the total area of all working electrode spots.

The sensor drift was calculated from repetitions of the glucose concentration stages over 7 days of in-vitro measurements.

The results are shown in Table 4:

TABLE 4

| Parameter | A | B | C |
|---|---|---|---|
| Mn Poly(nBuA-b-HEMA) [kDa] | 28-b-35 | 12-b-68 | 5-b-25 |
| Tg 1 [° C.] | −44 | −49 | n.m. |
| Tg 2 [° C.] | 115 | 118 | n.m. |
| nBuA [mol %] | 45 | 15 | 17 |
| HEMA [mol %] | 55 | 85 | 83 |
| nBuA-molecules [n] | 218 | 90 | 39 |
| HEMA-molecules [n] | 269 | 522 | 188 |
| layer thickness $L_m$ [µm] | 35 | 47 | 22 |
| $SE_m/F$ [nA/(mM*mm$^2$)] | 6.5 | 2.7 | 0.3 |
| $D_{eff}$ [cm$^2$/s] | 1.2E−08 | 6.7E−09 | 3.6E−10 |
| Drift [%] | −3.5 | −1.1 | 0.6 |
| Y20 mM[0%] | 74 | 88 | 83 | n.m. = not measured

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. An electrode system for measuring the concentration of an analyte under in-vivo conditions, comprising:
   an electrode having immobilized enzyme molecules and a diffusion barrier configured to control diffusion of the analyte from the exterior of the electrode system to the enzyme molecules;
   the diffusion barrier comprising a block copolymer having from 75 to 95 mol % of a 2-hydroxyethyl methacrylate (HEMA) block and from 5 to 25 mol % of a hydrophobic block of n-butyl acrylate (n-BuA) or ethyl acrylate (EA), based on the total amount (mol) of the block copolymer in a dry state;
   wherein the glass transition temperature of the hydrophobic block of the n-BuA or EA is in the range of about −80° C. and about 0° C.; and
   wherein subjecting a sensor having the electrode system to a 1 mm bending radius avoids indicia of Newton's Rings and/or a sensor having the electrode system has a sensitivity in the range of 1 to 1.5 nA/mM analyte.

2. The electrode system of claim 1, wherein the block copolymer is a diblock copolymer or a triblock copolymer.

3. The electrode system of claim 1, wherein the HEMA block of the block copolymer has a chain length in the range selected from the group consisting of 150 to 900, 200 to 800, 175 to 450, and 300 to 600.

4. The electrode system of claim 1, wherein the relative ratio of the chain length of the HEMA block and the chain length of the hydrophobic block of the n-BuA or EA is in a range selected from the group consisting of 2:1 to 20:1, 3:1 to 10:1, and 4:1 to 8:1.

5. The electrode system of claim 1, wherein the hydrophobic block of the n-BuA or EA has a weight average molecular weight (Mw) of about 19000 g/mol or lower.

6. The electrode system of claim 1, wherein the hydrophobic block of the n-BuA or EA has a weight average molecular weight (Mw) in the range of about 5000 g/mol to about 16000 g/mol.

7. The electrode system of claim 1, wherein the HEMA block has a weight average molecular weight (Mw) of about 24000 g/mol or higher.

8. The electrode system of claim 7, wherein the HEMA block has a weight average molecular weight (Mw) in the range of about 24000 g/mol to about 90000 g/mol.

9. The electrode system of claim 1, wherein the molar ratio of the HEMA block:the hydrophobic block of the n-BuA or EA is in the range of >75 mol-% (HEMA), <25 mol-% (the hydrophobic block of the n-BuA or EA) to 95 mol-% (HEMA), 5 mol-% (the hydrophobic block of the n-BuA or EA).

10. The electrode system of a claim 1, wherein the block copolymer has a number average molecular weight (Mn) in the range from 20 to 200 kDa.

11. The electrode system of a claim 1, wherein the block copolymer has a number average molecular weight (Mn) in the range from 25 to 95 kDa.

12. The electrode system of claim 1, wherein subjecting a sensor having the electrode system to a 1 mm bending radius avoids indicia of Newton's Rings.

13. The electrode system of claim 1, wherein a sensor having the electrode system has a sensitivity in the range of 1 to 1.5 nA/mM analyte.

14. The electrode system of claim 1, wherein the hydrophobic block of the n-BuA or EA of the block copolymer has a chain length selected from the group consisting from 200 to 300, 50 to 250, 50 to 100 and 50 to 150 monomeric unit.

15. A sensor configured for insertion or implantation into a body, comprising the electrode system of claim 1.

16. The sensor of claim 15, wherein the sensor is configured for the measurement of glucose.

* * * * *